United States Patent
Zhang et al.

(10) Patent No.: US 12,120,364 B2
(45) Date of Patent: *Oct. 15, 2024

(54) LOW LATENCY WIRELESS VIRTUAL REALITY SYSTEMS AND METHODS

(71) Applicants: Advanced Micro Devices, Inc., Santa Clara, CA (US); ATI Technologies ULC, Markham (CA)

(72) Inventors: Lei Zhang, Richmond Hill (CA); Gabor Sines, Markham (CA); Khaled Mammou, Vancouver (CA); David Glen, Markham (CA); Layla A. Mah, Lowell, MA (US); Rajabali M. Koduri, Saratoga, CA (US); Bruce Montag, Austin, TX (US)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/094,161

(22) Filed: Jan. 6, 2023

(65) Prior Publication Data

US 2023/0156250 A1    May 18, 2023

Related U.S. Application Data

(60) Continuation of application No. 17/132,304, filed on Dec. 23, 2020, now Pat. No. 11,553,222, which is a
(Continued)

(51) Int. Cl.
*G06F 15/16* (2006.01)
*H04L 65/70* (2022.01)
(Continued)

(52) U.S. Cl.
CPC ......... *H04N 21/2343* (2013.01); *H04L 65/70* (2022.05); *H04L 65/762* (2022.05);
(Continued)

(58) Field of Classification Search
CPC ......... H04N 21/2343; H04N 21/43072; H04N 21/23605; H04N 21/2368;
(Continued)

(56) References Cited

U.S. PATENT DOCUMENTS 5,808,722 A    9/1998 Suzuki
6,477,313 B1    11/2002 Itoi
(Continued)

*Primary Examiner* — Moustafa M Meky
(74) *Attorney, Agent, or Firm* — Volpe Koenig

(57) ABSTRACT

A device and method for processing Virtual Reality (VR) data is disclosed. The method comprises transmitting feedback information from the device to a server, wherein the feedback information is captured in the device, receiving data from the server to be presented on the device based on the feedback information, wherein the data includes video data and audio data where the video data is a frame of video data in a sequence of frames and the audio data is the corresponding audio data of the frame, decoding the video data and corresponding audio data of the frame, and controlling the presentation of the video data and corresponding audio data on the device such that the video data is synchronized with the corresponding audio data.

22 Claims, 4 Drawing Sheets

Related U.S. Application Data continuation of application No. 16/561,982, filed on Sep. 5, 2019, now Pat. No. 10,880,587, which is a division of application No. 15/130,885, filed on Apr. 15, 2016, now Pat. No. 10,432,988.

(51) Int. Cl.

| | |
|---|---|
| *H04L 65/75* | (2022.01) |
| *H04L 67/131* | (2022.01) |
| *H04L 69/24* | (2022.01) |
| *H04N 21/2343* | (2011.01) |
| *H04N 21/236* | (2011.01) |
| *H04N 21/2368* | (2011.01) |
| *H04N 21/414* | (2011.01) |
| *H04N 21/422* | (2011.01) |
| *H04N 21/43* | (2011.01) |
| *H04N 21/434* | (2011.01) |
| *H04N 21/437* | (2011.01) |

(52) U.S. Cl.
CPC ............ *H04L 67/131* (2022.05); *H04L 69/24* (2013.01); *H04N 21/23605* (2013.01); *H04N 21/2368* (2013.01); *H04N 21/41407* (2013.01); *H04N 21/42202* (2013.01); *H04N 21/43072* (2020.08); *H04N 21/4341* (2013.01); *H04N 21/4343* (2013.01); *H04N 21/437* (2013.01)

(58) Field of Classification Search
CPC ....... H04N 21/41407; H04N 21/42202; H04N 21/4341; H04N 21/4343; H04N 21/437; H04L 65/70; H04L 65/762; H04L 67/131; H04L 69/24
USPC ......................................................... 709/247
See application file for complete search history.

(56) References Cited

U.S. PATENT DOCUMENTS

| | | | |
|---|---|---|---|
| 7,099,951 B2 | 8/2006 | Laksono | |
| 7,103,105 B2 | 9/2006 | Oh | |
| 7,200,855 B2 | 4/2007 | Laksono | |
| 7,301,900 B1 | 11/2007 | Laksono | |
| 7,434,154 B2* | 10/2008 | Konetski | H04N 21/6543 |
| | | | 348/E7.063 |
| 7,561,178 B2* | 7/2009 | Baartman | H04N 21/4884 |
| | | | 348/14.08 |
| 7,672,743 B2* | 3/2010 | Messer | G10L 19/167 |
| | | | 704/500 |
| 7,783,153 B2 | 8/2010 | Yang | |
| 8,291,457 B2 | 10/2012 | Laksono | |
| 8,379,150 B2 | 2/2013 | Tseng et al. | |
| 8,670,072 B1 | 3/2014 | Liang | |
| 9,185,225 B1* | 11/2015 | Vance | H04M 11/10 |
| 9,197,435 B2 | 11/2015 | Laksono | |
| 9,271,003 B2 | 2/2016 | Swenson et al. | |
| 9,317,772 B2 | 4/2016 | Shellshear | |
| 9,564,102 B2 | 2/2017 | Justice et al. | |
| 9,886,980 B2 | 2/2018 | Yarygin et al. | |
| 10,880,587 B2* | 12/2020 | Zhang | H04N 21/234345 |
| 2005/0047417 A1 | 3/2005 | Lee et al. | |
| 2006/0241796 A1* | 10/2006 | Messer | G10L 19/167 |
| | | | 704/E19.048 |
| 2007/0274675 A1 | 11/2007 | Park | |
| 2007/0297454 A1* | 12/2007 | Brothers | H04L 65/4015 |
| | | | 370/486 |
| 2007/0299983 A1* | 12/2007 | Brothers | H04N 21/2368 |
| | | | 725/105 |
| 2008/0240684 A1 | 10/2008 | Tseng et al. | |
| 2012/0263241 A1 | 10/2012 | Swenson et al. | |
| 2013/0141643 A1* | 6/2013 | Carson | H04N 21/43072 |
| | | | 348/515 |
| 2014/0049689 A1 | 2/2014 | Liang | |
| 2014/0267429 A1 | 9/2014 | Justice | |
| 2014/0344469 A1* | 11/2014 | Nicholls | H04L 65/762 |
| | | | 709/231 |
| 2015/0092856 A1 | 4/2015 | Mammou et al. | |
| 2015/0178568 A1 | 6/2015 | Shellshear | |
| 2015/0319405 A1 | 11/2015 | Yarygin et al. | |
| 2016/0103830 A1* | 4/2016 | Cheong | G06F 16/745 |
| | | | 715/738 |
| 2021/0076966 A1* | 3/2021 | Grantcharov | G06F 16/7867 |

\* cited by examiner

LOW LATENCY WIRELESS VIRTUAL REALITY SYSTEMS AND METHODS

CROSS-REFERENCE TO RELATED APPLICATIONS

This application is a continuation of U.S. patent application Ser. No. 17/132,304, filed Dec. 23, 2020, which is a continuation of U.S. patent application Ser. No. 16/561,982, filed Sep. 5, 2019, now U.S. Pat. No. 10,880,587, issued on Dec. 29, 2020, which is a divisional of U.S. application Ser. No. 15/130,885, filed Apr. 15, 2016, now U.S. Pat. No. 10,432,988 issued on Oct. 1, 2019, from which priority is claimed, the contents of which are incorporated herein by reference in their entirety.

TECHNICAL FIELD

This application is generally directed to Virtual Reality (VR) systems, apparatuses and methods, and in particular, to high visual quality video display and low latency wireless VR systems and methods which include predicting a user viewpoint of a next frame of video based on user feedback information and handshaking protocols between client and server components.

BACKGROUND

VR systems use interactive applications to simulate different types of environments. VR systems seek to provide a realistic visual experience to immerse users in these simulated environments and artificially create sensory experiences of the users. The visual experience is made more realistic by displaying what users expect to see, in real time, throughout their experience.

The realistic experience is facilitated by displaying the video data with high visual quality (e.g., high definition) and low latency (the amount of time for the data to traverse VR sub-systems and/or VR devices). When the visual quality is lacking or the latency of the data increases, the realism of the visual experience may be negatively affected.

BRIEF DESCRIPTION OF THE DRAWINGS

A more detailed understanding may be had from the following description, given by way of example in conjunction with the accompanying drawings wherein.

DETAILED DESCRIPTION

Figure 1:
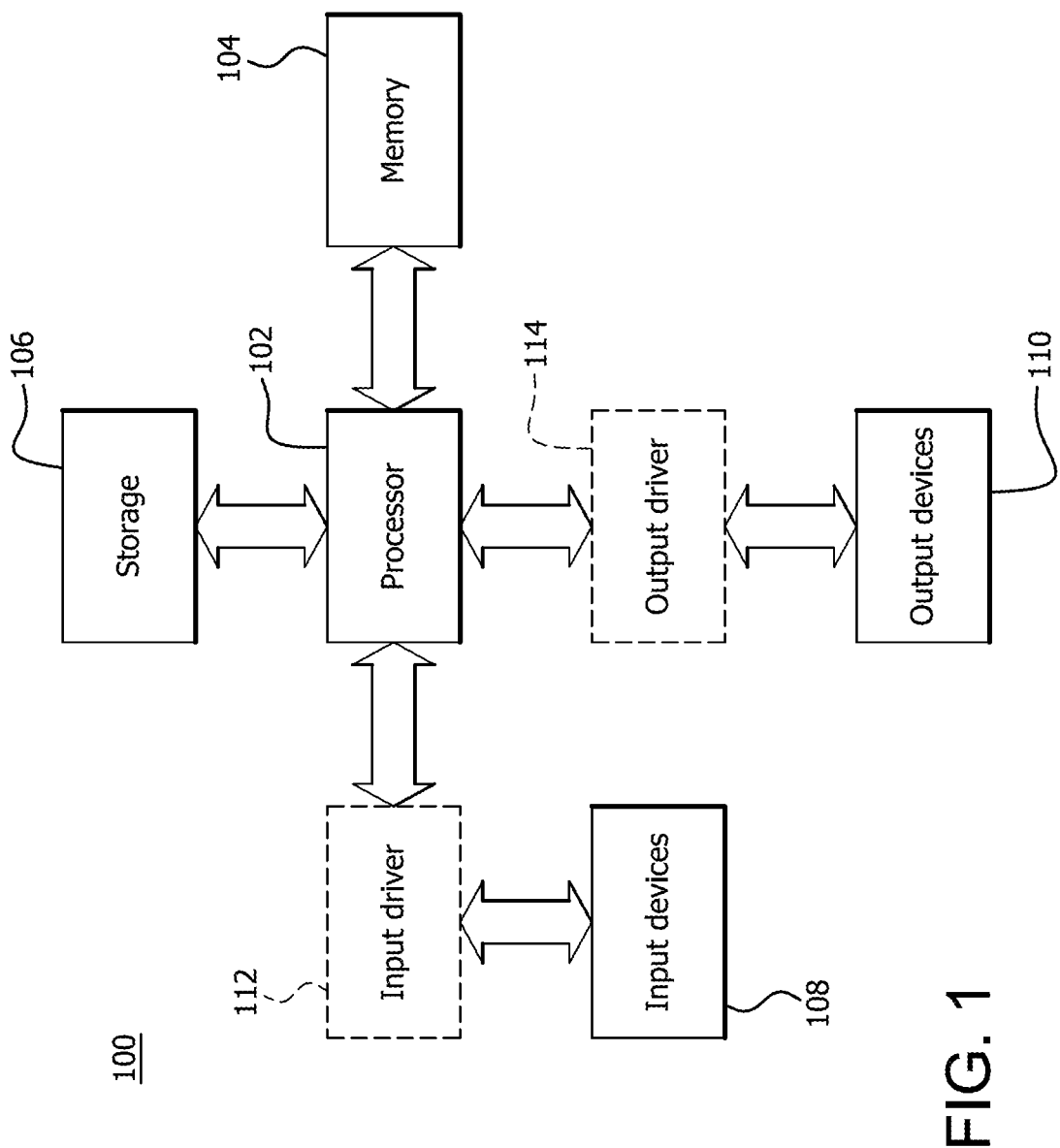
FIG. 1 is a block diagram of an example device in which VR systems, apparatuses, and methods disclosed herein may be implemented.

A method of processing Virtual Reality (VR) data is provided that comprises receiving user feedback information and using one or more server processors to predict, based on the user feedback information, a user viewpoint of a next frame of a sequence of frames of video data to be displayed, render a portion of the next frame of video data to be displayed using the prediction, encode the portion of the next frame of video data to be displayed and transmit the encoded and formatted portion of the next frame of video data to be displayed.

The method may further comprise using the one or more server processors to wirelessly transmit the encoded and formatted portion of the next frame of video data of video data to be displayed.

The method may further comprise using the one or more server processors to provide rendering instructions to render the portion of the next frame of video data to be displayed using the prediction, encode audio data corresponding to the portion of the next frame of video data using the prediction, combine the encoded audio data and encoded video data to encoded audio-video (A/V) data, format the encoded A/V data into one or more packets; and wirelessly transmit the combined encoded A/V data via a wireless channel dedicated to the encoded A/V data.

The user feedback information may comprise tracking information indicating at least one of a position and orientation of a portion of a user and the tracking information may be received via a wireless channel dedicated to the tracking information.

The feedback information may include time stamp information indicating a time when the feedback information is sensed prior to be received and the method may further comprise using the one or more server processors to determine when the portion of the next frame of video data to be displayed is rendered, indicate that the portion of the next frame of video data is rendered and encode the portion of the frame of video data in response to the indication.

The method may further comprise using one or more server processors to receive, at a server network interface controller (NIC), the encoded and formatted portion of the next frame of video data via direct memory access (DMA) and transmit, via the server NIC, the encoded and formatted portion of the next frame of video data via a channel dedicated to the tracking information.

A method of processing Virtual Reality (VR) data is provided that comprises transmitting user feedback information comprising at least one of user position information and user orientation information, receiving encoded audio-video (A/V) data generated based on the user feedback information and using one or more client processors to separate the A/V data to audio data and video data, the audio data corresponding to a portion of a next frame of a sequence of frames of the video data to be displayed, decode the portion of the next frame of the video data and the corresponding audio data, provide the audio data for aural presentation and control the portion of the next frame of the video data to be displayed in synchronization with the corresponding audio data.

The method may further comprise using the one or more client processors to wirelessly transmit the user feedback information.

The method may further comprise transmitting the user feedback information via a wireless channel dedicated to the feedback information.

The received A/V data may include time stamp information indicating a time when the feedback information is sensed prior to be received and the method may further comprise using the one or more client processors to determine when the portion of the video frame is decoded, indicate that the portion of the decoded video frame is decoded and in response to the indication, fetch the portion of the decoded video frame.

The A/V data may comprise packetized A/V data and the method further comprise using the one or more client processors to depacketize the A/V data and receive, at a client network interface controller (NIC), the packetized A/V data via direct memory access (DMA).

A processor device for processing Virtual Reality (VR) content is provided that comprises memory configured to store data and one or more client processors in communication with the memory and configured to control user feedback information, comprising at least one of user position information and user orientation information, to be transmitted from the processor device. The one or more client processors may also be configured to separate received encoded audio and video (A/V) data, generated based on the transmitted user feedback information, into audio data and video data, the audio data corresponding to a portion of a next frame of a sequence of frames of the video data to be displayed and decode the portion of the next frame of the video data and the corresponding audio data. The one or more client processors may also be configured to provide the audio data for aural presentation and control the portion of the next frame of video data to be displayed in synchronization with the corresponding audio data.

The user feedback information may be wirelessly transmitted via the transmission channel.

The A/V data may comprise packetized A/V data and the one or more client processors may be further configured to depacketize the A/V data and decode the portion of the next frame of video data and the corresponding audio data.

The processor device may further comprise a video decoder configured to decode the portion of the next frame of video data.

The processor device may further comprise an audio decoder configured to decode the corresponding audio data and a display controller configured to control the portion of the next frame of video data to be displayed in synchronization with the corresponding audio data.

The one or more client processors may be further configured to determine when the portion of the video frame is decoded, indicate that the portion of the decoded video frame is decoded, and in response to the indication, fetch the portion of the decoded video frame.

The processor device may further comprise a head mounted device (HMD) comprising a display configured to display the sequence of frames of the video data including the portion of the next frame and one or more audio providing devices configured to aurally provide the audio data; and one or more sensors configured to sense the user feedback information indicating at least one of user position information and user orientation information.

The processor device may further comprise at least one network interface controller (NIC) configured to wirelessly transmit the user feedback information receive the encoded A/V data generated based on the transmitted user feedback information.

A processor device for processing Virtual Reality (VR) content is provided that comprises memory configured to store data and one or more processor configured to predict, based on received user feedback information, a user viewpoint of a next frame of a sequence of frames of video data to be displayed, render a portion of the next frame of video data to be displayed using the prediction, encode the portion of the next frame of video data to be displayed and control transmission of the encoded portion of the next frame of video data to be displayed.

The one or more client processors may be further configured to wirelessly transmit the encoded and formatted portion of the next frame of video data.

The processor device may further comprise using the one or more server processors to provide rendering instructions to render the portion of the next frame of video data to be displayed using the prediction, encode audio data corresponding to the portion of the next frame of video data using the prediction, combine the encoded audio and video (A/V) data, format the encoded A/V data into packetized A/V data and wirelessly transmit the combined encoded and packetized A/V data via a wireless channel dedicated to the encoded and packetized A/V data.

The one or more server processors may be further configured to determine when the portion of the next frame of video data to be displayed is rendered, indicate that the portion of the next frame of video data is rendered and encode the portion of the frame of video data in response to the indication.

The user feedback information may comprises tracking information indicating at least one of a position and orientation of a portion of a user and the tracking information is received via a wireless channel dedicated to the tracking information.

The processor device may further comprise an audio encoder configured to encode audio data corresponding to the sequence of frames of video data, a video encoder configured to encode the portion of the next frame of video data and a multiplexer configured to combine the decoded A/V data.

Conventional VII systems, apparatuses and methods do not provide the high visual quality and the low latency for facilitating a continuous realistic VII system. The present application describes VR systems, apparatuses (e.g., VR client and VII server) and methods that provide a high visual quality (e.g., high-resolution, high-framerate) of video data (including a plurality of frames) with low latency over a VII network.

The present application discloses high visual quality, low latency systems, apparatuses and methods which utilize user feedback information, such as user tracking information (e.g., head position, orientation, gaze point, etc.) to predict user viewpoints in subsequent frames to compensate for time (latency) to render, encode (e.g., compress), packetize, transmit, depacketize and decode (e.g., decompress) data. As described herein, a frame is also used to denote a picture. A frame may be a progressive source frame or an interlaced source frame that includes two spatially interlaced fields. A portion of a frame may include, but is not limited to fields, slices, blocks and macroblocks. A portion of a frame may also be the frame.

Handshaking between hardware components and/or software components (e.g., portions of code) is utilized to decrease latency. For example, handshaking may be performed between: (i) a 3D server engine/asynchronous compute engine (herein after 3D server engine) and video encoder, (ii) the video encoder and a server NIC, (iii) a video decoder and a client NIC; and (iv) a 3D client engine/asynchronous compute engine (herein after 3D client engine) and the video decoder to provide low latency data transfer between each component. Handshaking may include different types of indications between components to decrease latency and synchronize the audio and video data. For example, handshaking may be used to indicate: a task (render a portion of a frame) is completed; a time remaining to complete a task; an amount of data (e.g., portion of a frame) remaining to complete a task; a portion of data (e.g., portion of a frame) is available for a next task (e.g., encoding) and acknowledgement of an indication. Exemplary server NICs and/or client NICs may include, for example, a network interface card, a network adapter, a LAN adapter, a physical network interface, and the like).

Feedback information between the wireless VR client and wireless VR server may be transmitted via a low latency communication channel dedicated to the feedback information. Encoded packetized A/V data between the wireless VR server and the wireless VR client may be transmitted via a low latency communication channel dedicated to the encoded packetized A/V data.

Wired mediums, such as Ethernet mediums, HDMI cables and video display cables, may be used (e.g., between a wireless VR client and wireless VR server) to facilitate high quality and low latency video data transfer. These mediums may, however, limit the mobility and interaction of the users, hindering the potential of the virtual reality experience.

The present application discloses high visual quality, low latency systems, apparatuses and methods which transmit A/V data via wireless mediums to enhance the VR experience by providing for freedom of movement in any direction. The bandwidths of such wireless mediums are limited compared to the bandwidth of wired mediums. Further, processing (additional to the processing of data transmitted via wired mediums) of the wirelessly transmitted data at different components may include corresponding latencies (time to complete processing) contributing to an overall system latency (e.g., time when user input data is collected and when the data is displayed to the user). The present application discloses wireless VR systems, apparatuses and methods which efficiently transmit data via wireless mediums, process (e.g., encode/decode data, packetize/de-packetize data) the wirelessly transmitted data and store the data to provide a realistic VR experience with high visual quality and low latency.

VR systems apparatuses and methods described herein may include transmission of A/V data via a network of wireless mediums, a wired medium network or a network having a combination of both wired and wireless mediums. For example, low latency communication channels dedicated to the feedback information and/or the encoded packetized A/V data may include wireless mediums, wired mediums or a combination of both wireless mediums and wired mediums.

A low latency direct memory access (DMA) path between the video encoder and the server NIC and a low latency direct DMA path between a client NIC and a video decoder may be used to facilitate high visual quality and low latency. Low latency slice-based decoding and low latency time warping of decoded video may be also be utilized as described herein.

FIG. 1 is a block diagram of an example device 100 in which VR systems, apparatuses, and methods disclosed herein may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
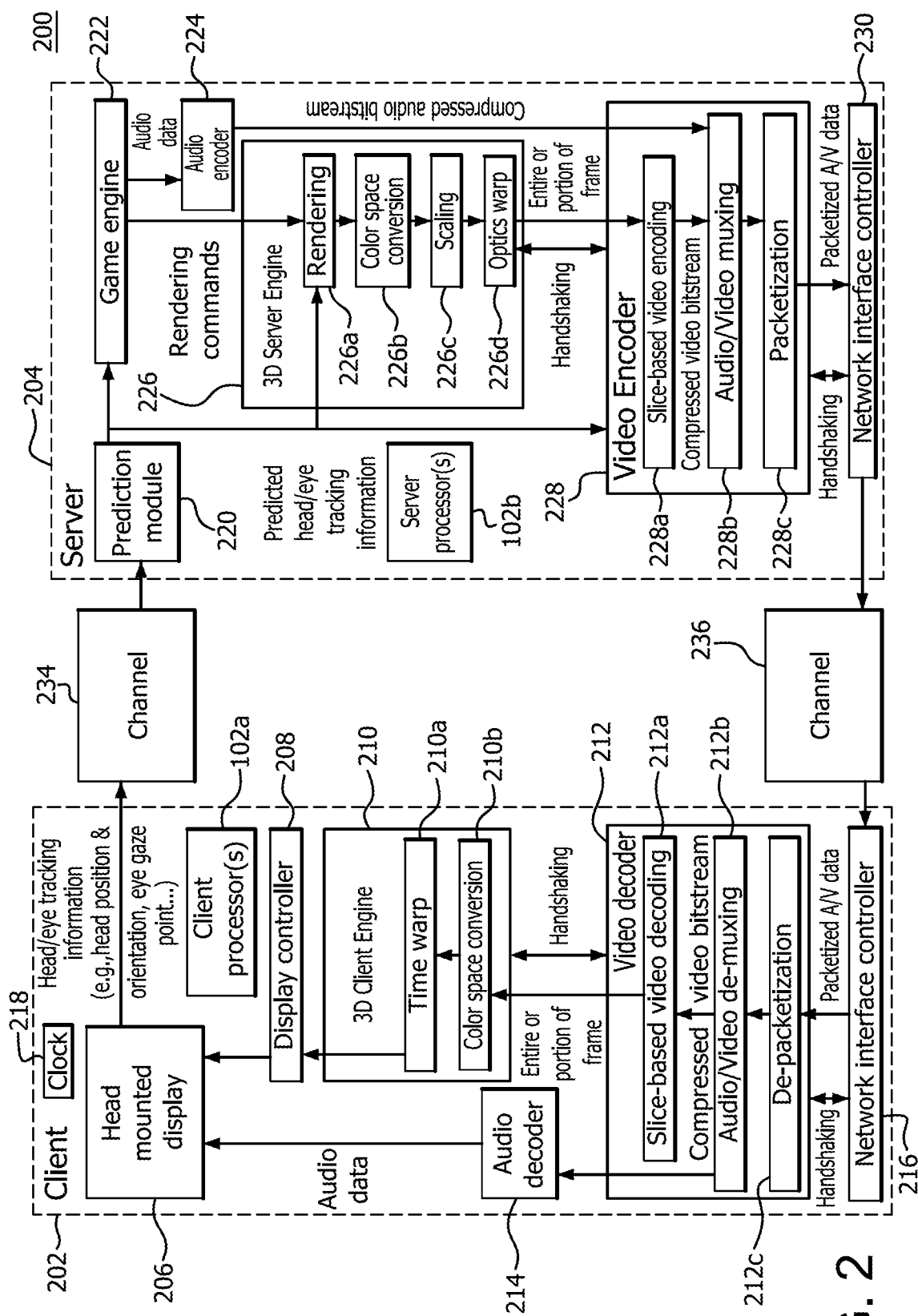
FIG. 2 is a block diagram illustrating an exemplary interconnection and information flow in an exemplary VR system.

FIG. 2 is a block diagram illustrating an exemplary interconnection and information flow in an exemplary virtual reality system 200. As shown in FIG. 2, the system 200 may include a VR client 202 and a VR server 204.

The VR client 202 and the VR server 204 may each include one or more of the components shown in FIG. 1, such as for example, processor 102, memory 104, storage 106, input devices 108, and output devices 110.

Some components, as described in more detail below, may perform tasks via hardware components, software components or a combination of hardware components and software components. Each of the client components may be part of a single device, for example a head mounted display device. Components may also be part of separate devices. Each of the server components may be part of a single device or may be part of separate devices.

Exemplary components may implemented as part of, or used with, systems or devices capable of rendering video data, video encoding and transmitting 3D content, such as for example, PCs, home server, game consoles (e.g., Xbox consoles or PlayStation consoles).

Example components described herein may also be implemented as part of, or used with, systems or devices (e.g., a head mounted display (HMD)) capable of displaying video data or interfacing with systems or devices, such as for example, smartphones, laptops, and the like.

Referring to FIG. 2, the client 202 may include HMD 206, a display controller 208, a 3D client engine 210, a video decoder 212 and an audio decoder 214. The client 202 may include a device (e.g., receiver, transmitter, and transceiver, such as a client network interface controller (NIC) 216, for transmitting information and/or receiving information over one or more networks (e.g., local area network), including wired (e.g., Ethernet) or wireless networks (e.g., via WiFi, Bluetooth, and other wireless standards). The client may also include one or more client processors 102, which may, for example, include one or more CPUs and/or one or more GPUs. The one or more processors 102 may be in communication with memory, such as memory 104. Each of the client components may be housed in a single device (e.g., device mounted to the head of a user). Client components may, however, be included in separate devices.

The head mounted display (HMD) 206 may be removably mounted on the head of a user (not shown). The HMD 206 may be mounted in a helmet, goggles or other mounting device. The HMD 206 may include a display (e.g., display monitor) configured to display images to a user (not shown). The monitors may include any of a variety of displays, such as liquid crystal displays (LCDs), electroluminescent displays, electrophoretic displays, field emission displays, light emitting diode (LED) displays, plasma displays, vacuum fluorescent displays (VFDs), and virtual retinal displays (VRDs).

The HMD 206 may be mounted in proximity to the user such that a portion of the display is aligned with a portion (e.g., eyes, portion of eyes (e.g., pupils)) of the user and the alignment is maintained or substantially maintained when the head (or other body parts) of the user moves during use. The HMD 206 may include audio providing components (e.g., headphones) configured to provide audio to the user. The audio providing components may also be separate from the HMD 206. The HMD 206 may include a separate monitor for each eye, or a single monitor for both eyes. Images may be superimposed on a real-world view, as part of an augmented reality or mixed reality display.

The HMD 206 may also include one or more sensors (not shown) configured to sense tracking information, such as head or eye tracking information (e.g., head position, head orientation and eye gaze point). One or more of the sensors may be also separate from the HMD 206. The HMD 206 may also include a transmitter configured to transmit the sensed tracking information as feedback information to server 204 to predict a user viewpoint of a next frame of a sequence of frames of video data to be displayed. The client 202 may also include a transmitter separate from the HMD 206 configured to transmit the sensed tracking information as feedback information to server 204.

The client 202 may include a system clock 218 to facilitate synchronization of the client 202 and the server 204. For example, the feedback information may include time stamp information indicating a time (e.g., point in time, time interval) via system clock 218 when the feedback information is sensed at the client 202. The time stamp may include a sequence of characters or encoded information. The time stamp may include a time code having a sequence of generated codes (e.g., numeric codes). The time stamp or time code may be generated at regular intervals, upon demand or upon the occurrence of an event. The clock 218 may be separate from, or part of, the HMD 206. The clock 218 may be in communication with sensors and/or client processor(s) 102 to provide the time stamp for the sensed feedback information.

Display controller 208 may receive video signals from the 3D client engine 210 and display video to HMD 206 for display. Display controller 208 may comprise one or more of its own processors dedicated to receiving decoded video signals and providing the video signals for display and may also communicate with processor(s) 102. Display controller 208 may leverage the one or more processors 102 to provide the video signals for display.

The 3D client engine 210 may include a portion of software, having instructions and/or commands, which may execute on a processor or leverage multiple processors 102, such as one or more CPUs and one or more GPUs. The 3D client engine 210 may include a time warp portion 210a and a color space conversion portion 210b. The 3D client engine 210 may be a portion of software that runs on or leverages one or more processors 102, such as CPUs and GPUs. The 3D client engine 210 may receive decoded information from decoder 212 and provide information to display controller 208.

The video decoder 212 and the audio decoder 214 decode A/V data received from network interface controller 216. The video decoder 212 and the audio decoder 214 may be implemented in hardware or software. A/V data may be decoded via software and hardware. The video decoder 212 may include a slice-based video decoding portion 212a, an A/V de-muxing portion 212b and a de-packetization portion 212c, each of which may be implemented in software or hardware. The de-muxing and de-packetization may minimize latency and the load on client processor(s) 102 (e.g., CPU).

The client NIC 216 may be a device used to connect one or more client components (e.g., client processor(s) 102, video decoder 212, and audio decoder 214) to one or more server components (e.g., server processor(s) 102, video encoder 212, and audio encoder 224) via one or more wireless networks using low latency channel 236 dedicated to the A/V data and low latency channel 234 dedicated to the tracking information. Separate client NICs may also be used to communicate via the low latency channel 236 and the low latency channel 234. Client NICs may also be used to communicate the A/V data and tracking information over wired networks or a combination of wired and wireless networks.

The video decoder 212 may implement handshaking protocols with the 3D client engine 210 and client NIC 216. The video decoder 212 may interface with NIC 216 and receive the encoded A/V data via DMA.

Handshaking may, however, be performed between client processor(s) 102 (e.g., CPU) and client NIC 216. For example, A/V de-muxing and de-packetization may be performed separate from the video decoder 212, such as via software using client processor(s) 102 (e.g., CPU). Accordingly, handshaking may occur between client processor(s) 102 (e.g., CPU) and client NIC 216 and without DMA.

The server 204 may include a prediction module 220, a game engine 222, an audio encoder 224, a 3D server engine 226 and a video encoder 228. The server 204 may also include a device (e.g., receiver, transmitter, and transceiver, such as a client network interface controller (NIC) 230, for transmitting information and/or receiving information over one or more networks (e.g., local area network), including wired (e.g., Ethernet) or wireless networks (e.g., via WiFi, Bluetooth, and other wireless standards). The server 204 may also include one or more server processor(s) 102, which may include may include, for example, one or more CPUs and/or and one or more GPUs.

The prediction module 220 may receive (e.g., via NIC 230 or a separate NIC dedicated to channel 234) the feedback information from client 202. The server 204 may also include a receiver, separate from the prediction module and in communication with other server components (e.g., prediction module 220, server processor(s) 102 and game engine 222), that is configured to receive the feedback information from client 202. The prediction module 220 may be configured in software, hardware or a combination of software and hardware to receive the feedback information from the client 202, such as the head and/or eye tracking information via low latency channel 234 dedicated to the feedback information. The prediction module 220 may provide prediction information (e.g., information indicating where the viewpoint of the user will be in the next frame) to the game engine 222 and the 3D engine 226. The prediction module 220 may utilize the time stamp information indicating a time when the tracking information is sensed at the client 202.

Game engine 222 may include a plurality of libraries, such as software development kits (SDKs). Games or simulations may be developed on the game engine 222 to provide applications that include rendering instructions/commands to render (e.g., frame rendering) data as images for display. The applications may run on a processor or leverage multiple processors 102 to provide the rendering instructions/commands to the 3D server engine 226 using the predicted information from prediction module 220. The game engine 222 may, for example, make different make decisions on what data should be rendered, generate outputs (e.g., frames) based on collected user inputs, and run simulations to detect events, such as collisions.

The 3D server engine 226 may execute the rendering instructions/commands using a processor or leverage multiple processors 102, such as CPUs and GPUs to generate the next frame or portion of the next frame of video. The 3D server engine 226 may use the prediction information from the prediction module 220 to generate the next frame or portion of the next frame of video. As shown in FIG. 2, 3D server engine 226 may include a rendering portion 226a to render the next frame or the portion (e.g., slice, block, macro block, and field) of the next frame. The 3D server engine 226 may also include a color space conversion portion 226b (e.g., to convert the next frame or the next frame portion represented one color space to another color space), a scaling portion 226c (e.g., to scale the next frame or the next frame portion) and an optics warp portion 226d (e.g., to correct image distortion). One or more of portions, such as portions 226b through 226d, may not be included.

The audio encoder 224 may encode audio data received from game engine 222. The audio encoder 224 may be implemented in hardware or software. Audio may be encoded via software encoding and hardware encoding.

The video encoder 228 may receive prediction information from prediction module 220, audio data from audio encoder 224 and video data from 3D server engine 226 and provide encoded video data (either 3D or non-3D video) and/or audio data to the server NIC 230. The video encoder 228 may include a slice-based encoding portion 228a, an A/V muxing portion 228b to provide A/V synchronization and a packetization portion 228c to format the video data into packets (e.g., IP packets) for transporting over a wireless network. Different types of packets may be used according to different types of protocols. The video data may be sliced into smaller packets (e.g., packetized elementary stream (PES) packets) and then loaded into larger packets, such as IP packets. The multiplexing and packetization performed using A/V muxing portion 228b and packetization portion 228c of video encoder 228 may minimize latency and the load on server processor(s) 102 (e.g., CPU).

The video encoder 228 may implement handshaking protocols with the 3D server engine 226 and server NIC 230, as described in more detail below. The video encoder 228 may interface with NIC 230 and provide the encoded A/V data via DMA.

Handshaking may, however, be performed between server processor(s) 102 (e.g., CPU) and server NIC 230. For example, A/V multiplexing and packetization may be performed separate from the video encoder 228, such as via software using server processor(s) 102 (e.g., CPU). Accordingly, handshaking may occur between server processor(s) 102 (e.g., CPU) and server NIC 230 and without DMA.

The video encoder 228 may be implemented in hardware or software. Video may be encoded using both software and hardware components. The video encoder 228 may include one or more processors dedicated to the video decoder 228. The video encoder 228 may also encode the data using or leveraging the one or more server processors 102.

The server NIC 230 may be a device used to connect one or more server components (e.g., server processor(s) 102, video encoder 228, and audio encoder 224) to one or more other server components (e.g., server processor(s) 102, video encoder 212, and audio encoder 224) via one or more wireless networks using low latency channel 236 dedicated to the A/V data and low latency channel 234 dedicated to the tracking information. Separate server NICs may also be used to communicate via the low latency channel 236 and the low latency channel 234. Server NICs may also be used to communicate the A/V data and tracking information over wired networks or a combination of wired and wireless networks.

The feedback information may be sent wirelessly from the client 202 to the server 204 via the low latency wireless channel 234 dedicated to the feedback information 234 to provide a low latency path. Further, information, such as A/V information may be sent wirelessly from the server 204 to the client 202 via a wireless channel 236 dedicated to the A/V information to provide a low latency wireless medium. The feedback information and the A/V information may be wirelessly transmitted according to any of a variety of wireless protocols, such as for example, Wi-Fi (e.g., IEEE 802.11 protocols, such as 802.11ac, 802.11ad and the like), ZigBee (IEEE 802.15.4-2006), Radio Frequency for Consumer Electronics (RF4CE), 6LoWPAN, ONE-NET, Bluetooth, wireless USB, ANT and Infra-red Data Association (IrDA). Further, the client 202 and the server 204 may each include a wireless transmitter and receiver (not shown) for transmitting the feedback information and the A/V information according to a corresponding wireless protocol.

An example flow of displaying video data using the system 200 is shown in FIG. 2. For example, as shown in FIG. 2, the prediction module 220 receives the feedback information from the client 202, such as the head and/or eye tracking information via a low latency channel 234 dedicated to the feedback information. The feedback information may include time stamp information indicating a time via system clock 218 when the feedback information is sensed at the client 202. The prediction module 220 makes predictions (e.g., where the viewpoint of the user will be in the next frame) based upon the feedback information and provides prediction information corresponding to the prediction to the game engine 222 and the 3D engine 226. The prediction module 220 may utilize the time stamp information to provide the prediction information.

Game engine 222 receives the predicted information from prediction module 220 and provides rendering instructions/commands to the 3D server engine 226 to render video data. Game engine 222 also provides audio data to audio encoder 224.

The 3D server engine 226 receives the rendering commands from the game engine 222 and the prediction information from the prediction module 220 and generates data using the rendering commands and the prediction information. For example, the rendering portion 226a renders data (e.g., images, in stereoscopic view or non-stereoscopic view). As shown in FIG. 2, the color space conversion portion 226b performs color space conversion, the scaling portion 226c performs scaling of the video and the optics warp portion 226d performs image/optics warping to the video data. Color space conversion, scaling and image/optics warping may be performed in any order, based on a plurality of factors including processing time, memory traffic and video quality. One or more of the functions indicated at blocks 226b through 226d may not be performed. Processing of video data using system 200 may also be performed using none of the functions indicated at blocks 226b through 226d may be performed, i.e., a different process may be performed.

The audio and video data are encoded, wirelessly transmitted and decoded with low latency by utilizing handshaking protocols between hardware components and/or software components (e.g., portions of code), such as for example, between (i) 3D server engine 226 and video encoder 228; (ii) video encoder 228 and server NIC 230; (iii) video decoder 212 and client NIC 216; and (iv) a 3D client engine 210 and video decoder 212. An exemplary method of utilizing these handshaking protocols is now described.

The 3D server engine 226 stores the video data in an external buffer or an on-chip buffer (not shown). The video encoder 228 reads the data stored by the 3D server engine 226 in the one or more buffers. The video encoder 228 performs handshaking with 3D server engine 226. For example, when one or more of the tasks (e.g., rendering of a portion of the next frame) is completed, the 3D server engine 226 may indicate to the video encoder 228 that the rendering is completed and the portion of the next frame is available for encoding to decrease latency between the video encoder 228 and the 3D server engine 226.

The handshaking may be used to provide buffer management (e.g., prevent or limit underflow and overflow of the one or more buffers). The input buffer rate or the output buffer rate may also be adjusted based on the handshaking. The handshaking may also be used to efficiently synchronize the encoded video data with the encoded audio data at A/V muxing portion 228b.

In response to receiving the indication from the 3D server engine 226, the video encoder 228 may encode the portion of the next frame. The video encoder 228 may encode the video on a per slice basis at portion 228a. The video encoder 228 may also encode different portions (e.g., one or more macro blocks) of the video bit stream at a time. The video encoder 228 synchronizes the audio and video data of the encoded slice and formats the encoded A/V data into IP packets.

The video encoder 228 may encode the image in stereoscopic view. During stereoscopic encoding, the video encoder 228 may reference the previous frame of the same view and the same frame of a different view for both frame sequential mode or left and right eye view. The video encoder 228 may also encode the image in non-stereoscopic view. Leveraging of proprietary time warp data received from the client 202 video encoder 228 may be implemented for encoding guidance.

The video encoder 228 interfaces via DMA with server NIC 230 and transfers the packetized data to the server NIC 230 without additional processor involvement to reduce latency. Each of the game engine 222, the audio encoder 224, the server 3D engine 226 and the video encoder 228 may run on or leverage one or more processors 102, which may include CPU(s) and GPU(s) to perform any of the functions described herein.

The server NIC 230 transmits the data wirelessly from the server 204 to the client 202 via a wireless channel 236 dedicated to the A/V information to provide a low latency wireless medium. Client NIC 216 receives the encoded A/V data from the VR server 204. The client NIC 216 interfaces with the video decoder 212 and transfers the A/V IP packets via DMA to the video decoder 212 without additional CPU involvement.

The video decoder 212 depacketizes the IP packets at portion 212c and de-muxes the A/V data at 212b. The compressed audio data is decoded by audio decoder 214 and the compressed video data is decoded (e.g., slice level video decoding) at portion 212a. The audio decoder 214 interfaces with the client NIC 216, depacketizes the IP packets and extracts and decodes the audio data.

The 3D client engine 210 receives the decoded bit stream from the video decoder 212, which may include any number of portions of decoded video (e.g., a frame or a portion of the frame). The 3D client engine 210 may perform handshaking with the video decoder 212. The 3D client engine 210 may also perform handshaking with the display controller 208. The 3D client engine 210 may, after a pre-determined number of slices is decoded, fetch and run a display shader to perform real time and/or image warping (via time warp portion 210a) on the data decoded by the video decoder.

The video decoder 212 performs handshaking with 3D client engine 210 to provide buffer management, efficiently synchronize the encoded video data with the encoded audio data at A/V de-muxing portion 212b and decrease latency between the video decoder 212 and the 3D client engine 210. For example, when a portion of the video frame or the entire video frame is decoded, the video decoder 212 may indicate to the 3D server engine 226 that the video data is decoded and the decoded video information is available to be fetched. In response to receiving the indication from the video decoder 212, the 3D client engine 210 runs a display shader at color space portion 210b and performs time and/or image warping at portion 210a on the decoded video data.

The display controller 208 receives the decoded video data from the 3D client engine 210 and provides video to the HMD 206 for display and the audio decoder provides the audio data to the HMD 206 for aural presentation. The display controller 208 may, after pre-determined amount of time, fetch and display the data decoded by the video decoder 212 and image warped by the 3D client engine 210. The data may be keyed into a hardware real time display shader framework. The pre-determined amount of time may, for example, range from a time to decode a portion of a frame to a time to decode a frame. The amount of time may be determined by a number of factors, including the bitrate and resolution capabilities of the video encoder 228 and video decoder 212.

The real time and/or image warping via the front-buffer display shader may be performed by 3D client engine 210 before or after color space conversion via portion 210b based on different factors, such as processing time, memory traffic and video quality. The display controller then provides video data for display.

Movements (e.g., head movements, eye movements) of the user, responsive to being provided the video data and audio data, may be sensed as feedback information (e.g., high frequency (e.g., 1 KHz+) tracking information) and sent back to the server 204 through the same or different channel to minimize the impact of the video/audio data transferred from the server 204.

VR systems and methods may also include texture space rendering. For example, a VR server 204 component (e.g., game engine) may generate rendered frames describing a texture atlas. The VR client 202 may generate stitched left/right views by rendering a scene, while using decoded frames as texture, providing an efficient rendering pass because the server 204 has already baked all the shading information in the texture atlas.

Figure 3:
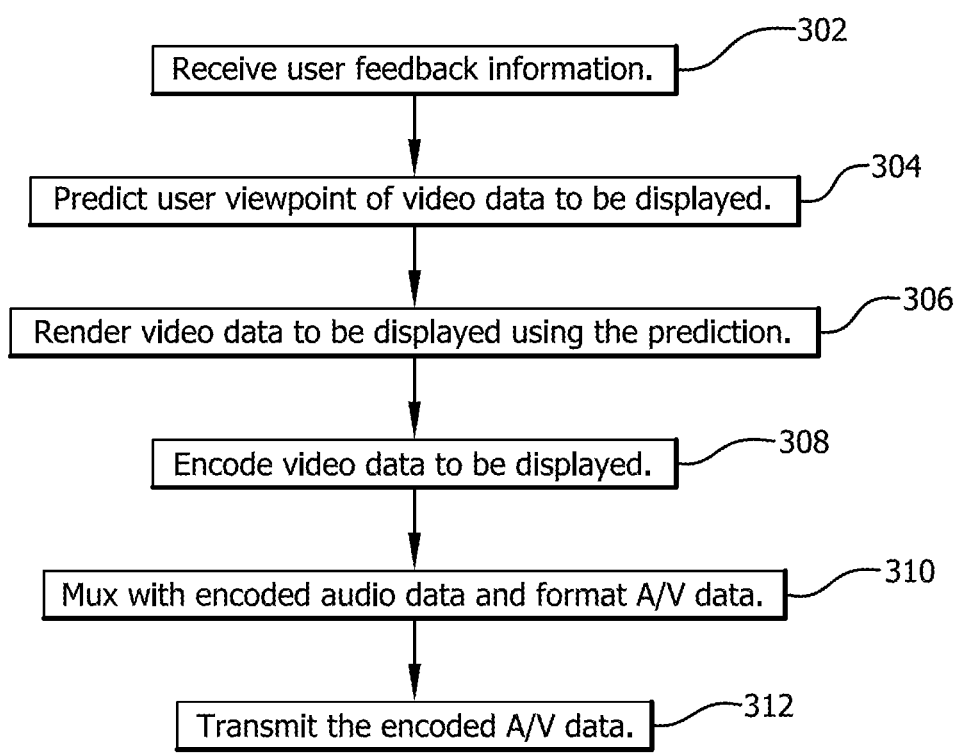
FIG. 3 is a flow diagram illustrating an exemplary method of processing video data by a server of a VII system.

FIG. 3 is a flow diagram illustrating an example method 300 of processing VR data. As shown at block 302 in FIG. 3, the method 300 includes receiving user feedback information. The feedback information may include time stamp information indicating a time when the feedback information is sensed at a client of a VR system. One or more server processors may be used to process data at blocks 304 to 312. As shown at block 304, the method may include predicting, based on the user feedback information, a user viewpoint of a next frame of a sequence of frames of video data to be displayed. At block 306 a portion of the next frame of video data to be displayed may be rendered using the prediction. Rendering may also be based on rendering commands (e.g., from a game engine).

As shown at block 308, the method 300 may include encoding the portion of the next frame of video data to be displayed. At block 310, the encoded portion of the next frame of video data may be multiplexed with corresponding (e.g., via time stamp) encoded audio data and formatted (e.g., into one or more packets). At block 312, the encoded A/V data may be transmitted. For example, the encoded A/V data may be wirelessly transmitted to a client via a dedicated wireless channel.

Figure 4:
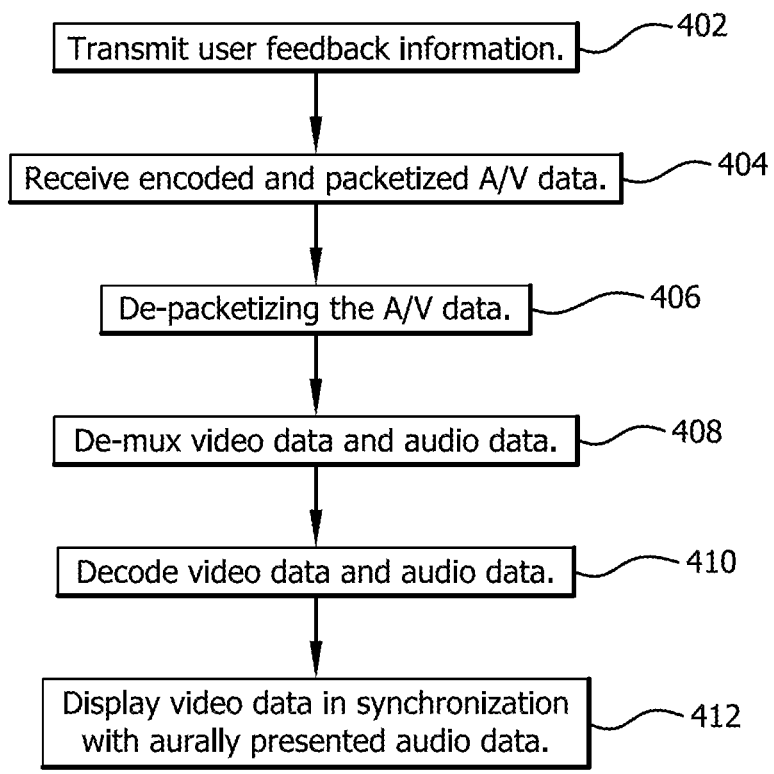
FIG. 4 is a flow diagram illustrating an exemplary method of transmitting user feedback information and processing video data by a client of a VII system.

FIG. 4 is a flow diagram illustrating an example method 400 of processing VR dat. As shown at block 402 in FIG. 4, the method 400 includes transmitting user feedback information comprising at least one of user position information and user orientation information. As shown at block 404, the method 400 includes receiving encoded and packetized A/V data generated based on the user feedback information. For example, the A/V data may be received via a dedicated wireless channel.

One or more client processors may be used to process data at blocks 406 to 412. As shown at blocks 406 and 408, the method 400 may include depacketizing the A/V data and separating the audio data from the video data. At block 410, the video data and the corresponding audio data may be decoded. At block 412, the portion of the next frame of video data may be displayed in synchronization with the aurally presented corresponding audio data. Additional user feedback information may be sensed and transmitted before, during or after the data is received and processed at blocks 404 to 412.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements methods disclosed herein.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing Virtual Reality (VR) data in a device, the method comprising:
    transmitting feedback information from the device to a server, wherein the feedback information is captured in the device;
    receiving data from the server to be presented on the device based on the feedback information, wherein the data includes a frame of video data in a sequence of frames and corresponding audio data;
    decoding the frame of video data and corresponding audio data; and
    controlling the presentation of the frame of video data and corresponding audio data on the device such that the frame of video data is synchronized with the corresponding audio data.

2. The method of claim 1, wherein the feedback information is used to predict a viewpoint of a next frame of a sequence of frames of video data.

3. The method of claim 1, wherein the feedback information comprises any one or both of user position information and user orientation information.

4. The method of claim 1, further comprising capturing the feedback information using one or more sensors.

5. The method of claim 4, wherein the feedback information captured using the one or more sensors includes head or eye tracking information.

6. The method of claim 1, wherein the feedback information includes time stamp information indicating a time when the feedback information is generated.

7. The method of claim 1, wherein the feedback information is transmitted to the server using a wireless transmission protocol.

8. The method of claim 1, wherein the data is received from the server using a wireless transmission protocol.

9. The method of claim 1, wherein the feedback information is continuously transmitted to the server.

10. The method of claim 1, wherein the controlling the presentation of the frame of video data and corresponding audio on the device includes:
    displaying the frame of video data on a display; and
    playing the corresponding audio data on a speaker.

11. A device for processing Virtual Reality (VR) data, the device comprising:
    memory configured to store data;
    a processor in communication with the memory; and
    a transceiver;
    wherein the processor and transceiver are configured to:
    transmit feedback information from the device to a server, wherein the feedback information is captured in the device;
    receive data from the server to be presented on the device based on the feedback information, wherein the data includes a frame of video data in a sequence of frames and corresponding audio data;

decode the frame of video data and corresponding audio data; and control the presentation of the frame of video data and corresponding audio data on the device such that the frame of video data is synchronized with the corresponding audio data.

12. The device of claim 11, wherein the feedback information is used to predict a viewpoint of a next frame of a sequence of frames of video data.

13. The device of claim 11, wherein the feedback information comprises any one or both of user position information and user orientation information.

14. The device of claim 11, further comprising: one or more sensors configured to capture the feedback information.

15. The device of claim 14, wherein the feedback information captured using the one or more sensors includes head or eye tracking information.

16. The device of claim 11, wherein the feedback information includes time stamp information indicating a time when the feedback information is generated.

17. The device of claim 11, wherein the feedback information is transmitted to the server using a wireless transmission protocol.

18. The device of claim 11, wherein the data is received from the server using a wireless transmission protocol.

19. The device of claim 11, wherein the feedback information is continuously transmitted to the server.

20. The device of claim 11, further comprising:
a display; and
a speaker,
wherein the processor is further configured to display the frame of video data on the display and play the corresponding audio data on the speaker when controlling the presentation of the audio data and video data on the device.

21. A device for processing Virtual Reality (VR) data, the device comprising:
memory configured to store data; a processor in communication with the memory; and a transceiver;
wherein the processor and transceiver are configured to transmit feedback information from the device to a server, wherein the feedback information and includes time stamp information indicating a time when the feedback information is generated at the device;
receive data from the server, the data including a frame of video data in a sequence of frames and corresponding audio data, to be presented on the device based on the feedback information;
decode the frame of video data and corresponding audio data; and
control the presentation of the frame of video data and corresponding audio data on the device such that the frame of video data is synchronized with the corresponding audio data.

22. A device for processing Virtual Reality (VR) data, the device comprising:
memory configured to store data;
a processor in communication with the memory; and
a transceiver;
wherein the processor and transceiver are configured to transmit feedback information from the device to a server, wherein the feedback information includes time stamp information indicating a time when the feedback information is sensed at the device;
receive data from the server, the data including a frame of video data in a sequence of frames and corresponding audio data, to be presented on the device based on the feedback information;
decode the frame of video data and corresponding audio data; and
control the presentation of the frame of video data and corresponding audio data on the device such that the frame of video data is synchronized with the corresponding audio data.

* * * * *